W. J. OXER.
Cultivator.

No. 62,060.  Patented Feb. 12, 1867.

Witnesses:
Theo. Fische
J. A. Service

Inventor:
W. J. Oxer
per Munn
Attorneys

United States Patent Office.

W. J. OXER, OF WILLIAMSPORT, INDIANA.

Letters Patent No. 62,060, dated February 12, 1867.

---

IMPROVEMENT IN CULTIVATORS.

---

The Schedule referred to in these Letters Patent and making part of the same.

---

TO ALL WHOM IT MAY CONCERN:

Be it known that I, W. J. OXER, of Williamsport, in the county of Warren, and State of Indiana, have invented a new and useful Improvement in Cultivators; and I do hereby declare that the following is a full, clear, and exact description thereof, which will enable others skilled in the art to make and use the same, reference being had to the accompanying drawings, forming part of this specification, in which—

Similar letters of reference indicate like parts.

My invention consists in the combination of peculiarly shaped iron bars to form the frame of the cultivator, as hereinafter more fully described.

Figure 1:
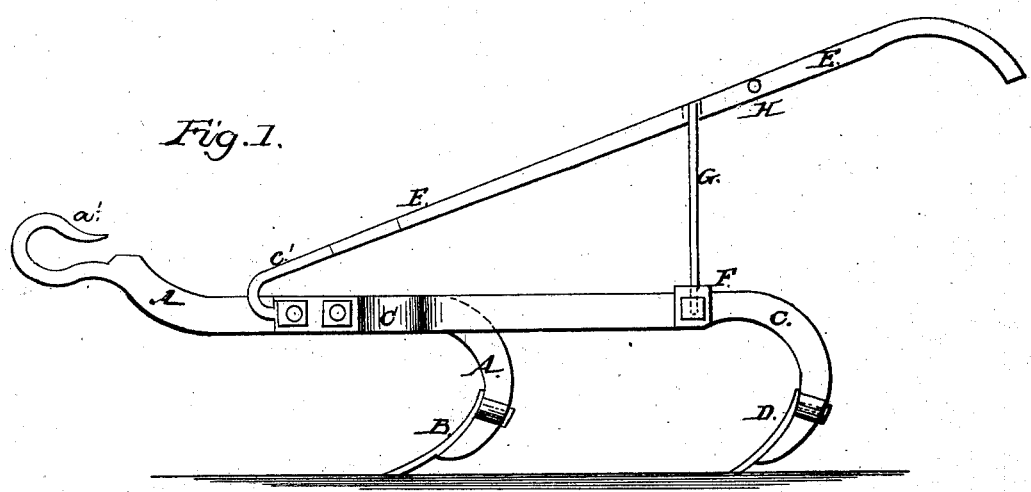
Figure 1 is a side view of my improved cultivator.
Figure 2:
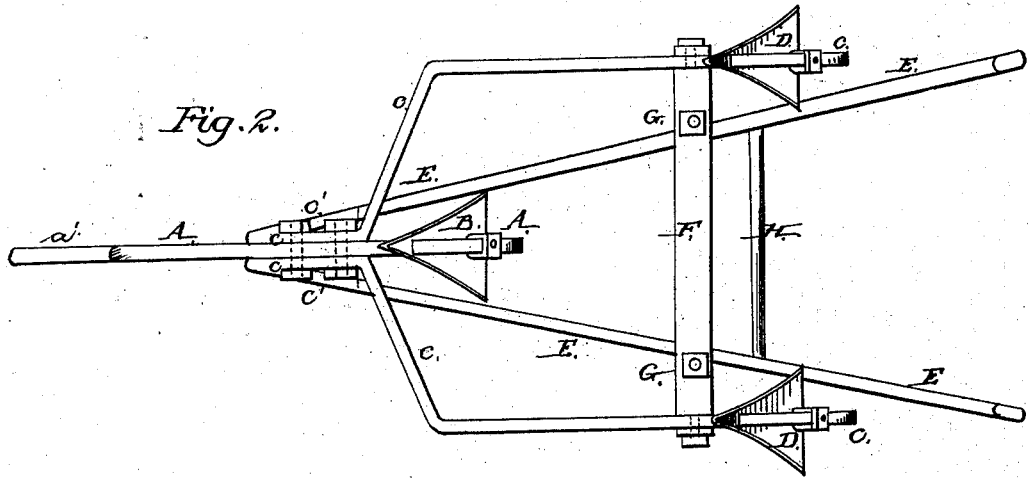
Figure 2 is an under side view of the same.

A is the central bar of the cultivator frame, the forward end of which projects and has a hook, $a'$, or other device, formed upon it for the attachment of the horse. The rear end of the bar A is curved downward, in substantially the shape shown in fig. 1, and has the plough B attached to it, as shown by a bolt passing through the plough and through the bar, the curve of the bar being such that the plough may lie along the forward side of the end of the said bar and be firmly supported. C are the side bars, the forward parts of which are securely bolted or otherwise attached to the horizontal part of the bar A, as shown in figs. 1 and 2. The bars C extend outward and backward from the point of attachment, in substantially the shape shown in fig. 2, and their rear ends curve downward in the same shape, and have ploughs D attached to them in the same manner as before described with reference to the bar A. The forward ends of the bars C are curved upward, or have necks $c'$ formed upon them, in the ends of which are formed sockets for the reception of the ends of the handles E. The rear parts of the bars C are held in their proper relative positions by the cross-bar F, the ends of which are securely bolted or otherwise attached to the said side bars C, as shown in figs. 1 and 2. E are the handles, the forward ends of which are inserted in the sockets $c'$ formed upon the forward ends of the bars C, as before described, and their rear ends are supported by being secured to the upper ends of the uprights G, the lower ends of which are secured to the cross-bar F, as shown in figs. 1 and 2. The handles E are connected and held in their proper relative position by the bar H in the ordinary manner. This construction gives a light, strong, and serviceable frame, and gives such a form and position to the ploughs that they will scour when the ploughs of other cultivators would clog.

I claim as new, and desire to secure by Letters Patent—

An improved iron cultivator frame formed by the combination of the bars A C and F with each other, when said bars are constructed and arranged substantially as herein shown and described.

W. J. OXER.

Witnesses:
DANIEL H. TWOMEY,
JOHN A. OWENS.